(12) United States Patent
Vakil et al.

(10) Patent No.: US 7,757,176 B2
(45) Date of Patent: Jul. 13, 2010

(54) METHOD AND SYSTEM FOR COLLECTIVE CALENDARING

(76) Inventors: Sanjay Vakil, 70 Newport St., Arlington, MA (US) 02476; David Rose, 131 Magazine St., #5, Cambridge, MA (US) 02139

( * ) Notice: Subject to any disclaimer, the term of this patent is extended or adjusted under 35 U.S.C. 154(b) by 474 days.

(21) Appl. No.: 11/796,657

(22) Filed: Apr. 27, 2007

(65) Prior Publication Data

US 2007/0260989 A1    Nov. 8, 2007

(51) Int. Cl.
*G06F 3/00* (2006.01)
(52) U.S. Cl. .................. 715/753; 715/751; 715/963
(58) Field of Classification Search .............. 715/751, 715/762, 783, 804, 963
See application file for complete search history.

(56) References Cited

U.S. PATENT DOCUMENTS

| | | | |
|---|---|---|---|
| 6,925,603 B1* | 8/2005 | Naito et al. | 715/733 |
| 7,299,240 B1* | 11/2007 | Crozier | 715/751 |
| 2004/0261013 A1* | 12/2004 | Wynn et al. | 715/511 |

* cited by examiner

*Primary Examiner*—Weilun Lo
*Assistant Examiner*—Truc T Chuong
(74) *Attorney, Agent, or Firm*—Douglas C. Wyatt

(57) ABSTRACT

A confluence calendar system and method is provided having a user platform with a user calendar having a number of events of importance to the user. Each of the user events can include date information, location information, and other event detail information. In addition, a serendipity server is provided for generating serendipitous events, based on information received from the user and third parties. The serendipity server sends the serendipitous events to the user for viewing, and for adding the serendipitous event to the user's calendar.

19 Claims, 5 Drawing Sheets

Figure 3
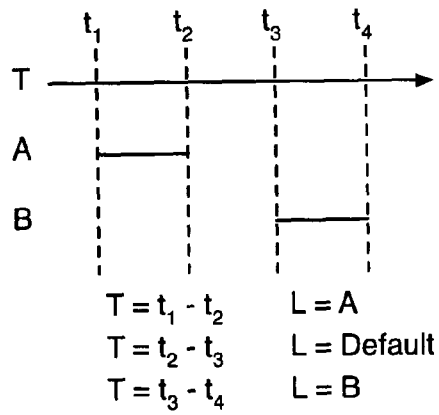
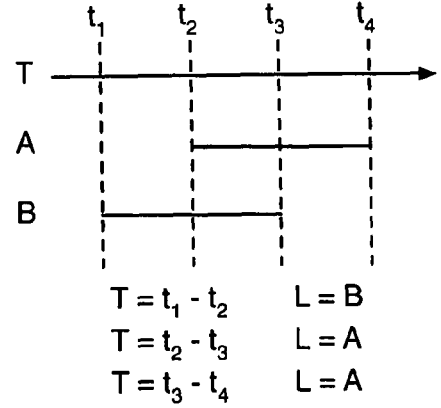
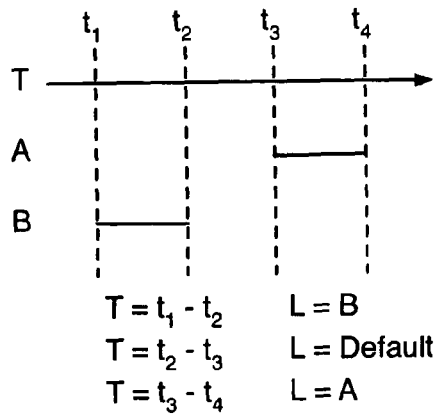
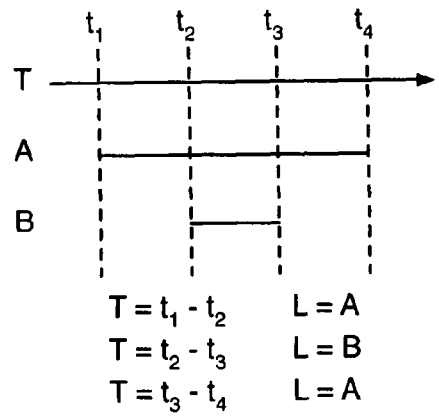
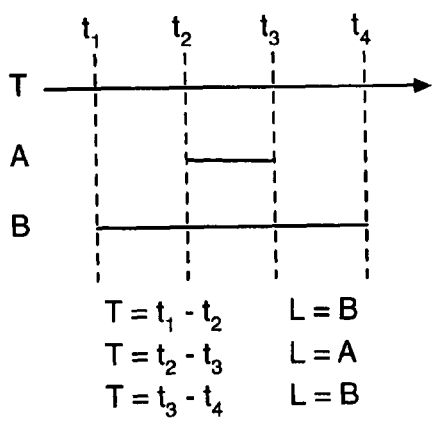
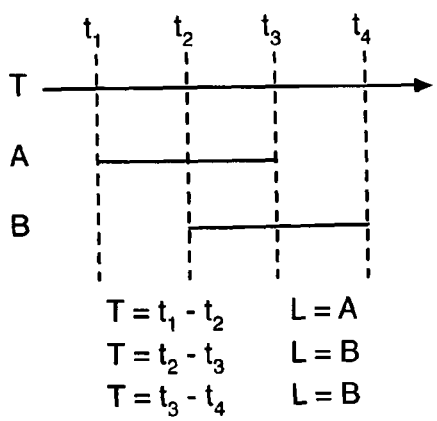

Figure 4
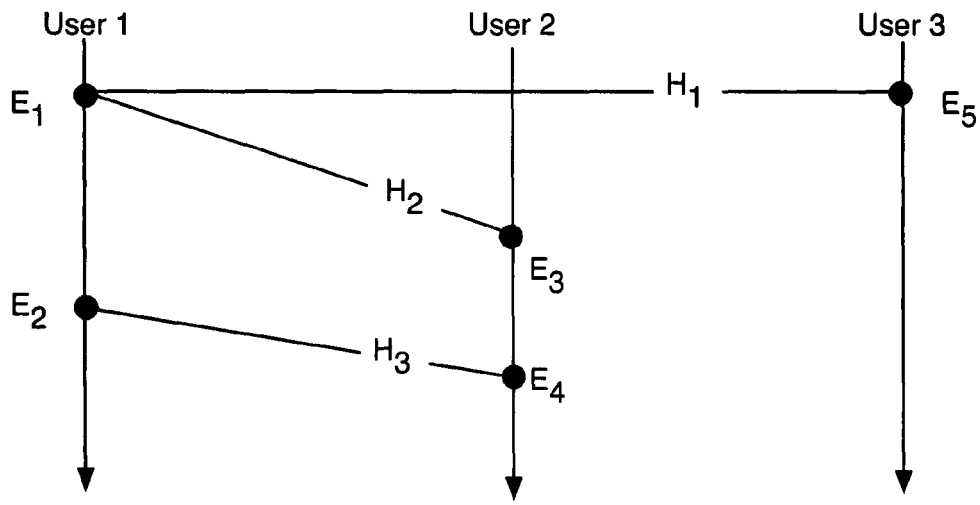
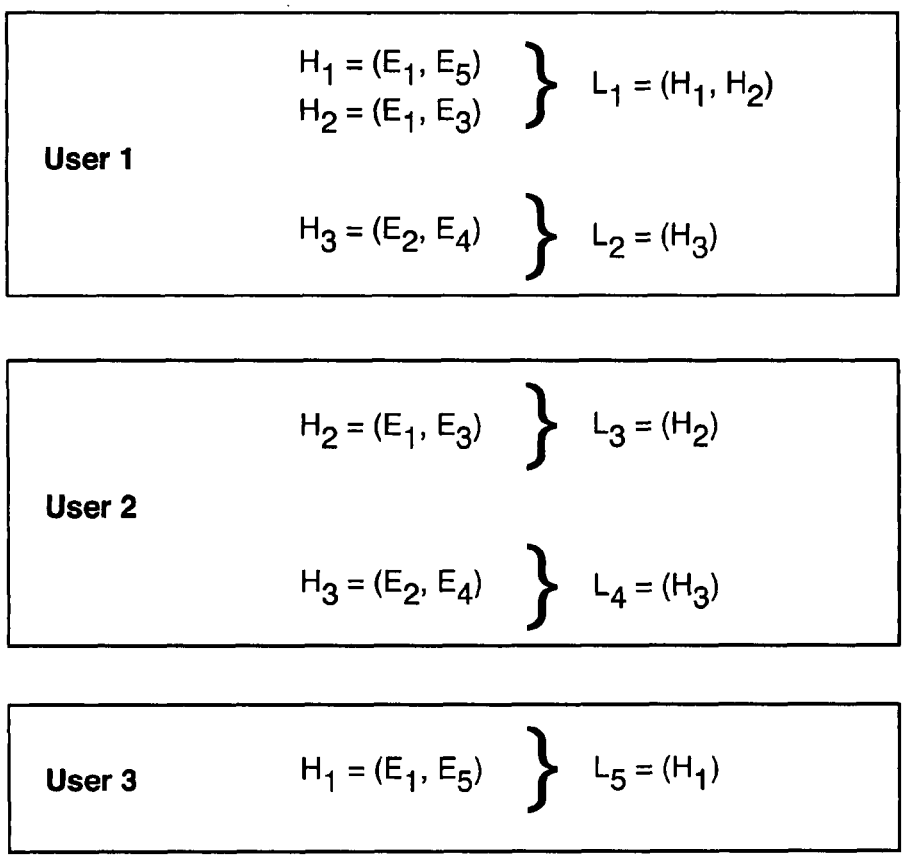

METHOD AND SYSTEM FOR COLLECTIVE CALENDARING

FIELD OF THE INVENTION

This invention is related to the art of Calendar systems, and more particularly related to the art of methods and systems for collective calendaring.

BACKGROUND OF THE INVENTION

Personal calendars have been an organizational tool that are beginning to be used to coordinate schedules among a number of users. For example, among existing calendaring systems, it is possible for a single user to send a multicast message to other known users to invite the other known users to an event, and upon acceptance of that invitation by the other known users, the event can become added to the other user calendars. Such active systems require coordination and cooperation among users to incorporate events into their schedules and require the individuals to actively resolve conflicts. Such systems do not permit the passive collection of calendar information, and do not generate serendipitous events based on a variety of information and criteria, among other things. Accordingly, there is a need for a system that can generate serendipitous events from various sources of information using techniques that make the collective calendaring system of use to an individual.

OBJECT OF THE INVENTION

It is an object of the invention to provide a method and system that provides a user with information concerning serendipitous events—event information from third parties that matches event information in a user's calendar. It is an object of the invention to match events in a user's calendar with events in another calendar by matching at least one relevant factor, including time, location, nature of the event, among other things. It is an object of the invention to simplify a set of serendipitous events to a manageable number for viewing by a user on a calendar. It is a further object of the invention to prioritize serendipitous events according to event information, rules, preferences, and feedback information, among other things to provide greater utility to the calendaring system.

It is a further object of the invention to resolve conflicts among events in a calendar. It is a further object of the invention to provide a user with additional information, including commercial offers, related to an event in a user's calendar. Furthermore, it is an object of the invention to provide a customizable method and system. It is a further object of the invention to provide a method and system that can provide user specific configuration settings as well as general rules to facilitate use of a calendaring system. It is another object of the invention to provide a method and system to allow users to subscribe to one or more additional calendars, using the calendar viewer of choice, which will provide access to additional events of serendipity with both personal contacts and commercial entities.

SUMMARY OF THE INVENTION

Serendipitous events are events which coincide with events that the user provides in the user's personal calendar. While serendipity can mean good luck in making unexpected and fortunate discoveries, it is an object of the invention to also provide event information that can be derived in a number of different ways, such as by choice and by design. Accordingly, the term "serendipitous" is not intended to limit the application to events that coincide by luck, but should be broadly understood to include events which are proximate by coincidence, by design, or by intent, among other things.

Accordingly, a confluence calendar system for use in a network of systems is provided having a serendipity comprising a serendipitous event generator. The serendipity server receives information from a user platform and at least one third party calendar source. A user platform can be provided comprising a user calendaring tool and a user network application. The user calendaring tool can comprise a plurality of user calendar events, which can include personal calendar data such as date information, location information, and event detail information, among other things. Date information can include time information. The third party calendar sources can include information such as third party calendar events. The third party calendar events can include third party calendar data such as date information, location information, and event detail information, among other things. The serendipitous event generator generates at least one serendipitous event by comparing the date information and location information of the user calendar data with the third party calendar data.

The serendipity server can also include a calendar processor for parsing the user calendar events and the third party calendar events to obtain personal calendar data and third party calendar data. The serendipity server can also harvest harvested user and third party events from the user and third party data, and generate serendipitous events based on the harvested events.

The serendipity server can include a preference and feedback processor which receives preference and feedback data from the user platform. Accordingly, the serendipitous event generator can generate serendipitous events based on the preference and feedback data.

The serendipity server can also flatten the user calendar events and third party calendar events whereby the plurality of user calendar events and the plurality of third party calendar events are assigned non-overlapping time information.

In addition, the event generator can prioritize the serendipitous events according to prioritizing criteria, such as event identification information, date information, location information, event detail information, preference and feedback data, among other things, and thereby generate new serendipitous events.

The serendipity server can create a confluence calendar, including one or more serendipitous events, sends the confluence calendar or confluence calendar data to the user platform. The confluence calendar or confluence calendar data can include third party calendar data.

In addition, the serendipity server can send some of the user calendar event data, such as user preferences or a scheduled flight event, to third party sources so that the third party sources can send information tailored to user calendar event data.

A method of collective calendaring is also provided. The collective calendaring method includes receiving user calendar event information from users, and receiving third party calendar events information from at least one third party calendar source. The method also includes generating at least one serendipitous event by comparing user calendar event information with third party event information based on at least one comparison criteria, or matching criteria such as event identification, date and location, and event detail information, among other things.

The method can also include parsing the user calendar events and third party calendar events to obtain individual fields of data. The method can also include flattening of user calendar events and third party calendar events to thereby assign non-overlapping time/date information for the events. The flattening process can also include assigning default location information to calendar events or time periods within calendars.

The generating process can include generating at serendipitous events by consolidating the harvested events. Additionally, or in the alternative, the method can include generating serendipitous events by prioritizing serendipitous events based on one or more prioritizing criteria, such as identification information, date information, location information, event detail information, preference data, feedback data, among other things, and thereby generate new serendipitous events.

Accordingly, the method can also include receiving preference and feedback information from the users, which can include information related to which events should be compared, harvested, and prioritized, and how serendipitous events should be generated.

Similarly, the method can also include includes generating serendipitous events by comparing or matching user calendar events information with third party calendar events information, based on one or more matching or comparison criteria, such as event identification, date and location, event detail information, and preference and feedback data, among other things.

The method can also include generating serendipitous events by prioritizing serendipitous events based on one or more prioritizing criteria such as event identification information, date information, location information, event detail information, and preference and feedback information, among other things.

The method can also include an approximation process of the comparison or matching criteria for use in the harvesting process and/or the process of generating serendipitous events. The approximation process can analyze event information and add a range to an approximation data associated with the event information.

This specification describes several embodiments for a method and system to generate one or more electronic calendars for one or more users based on examining their existing, published, electronic personal calendars, and includes the collection of calendar and non-calendar information for methods of providing information to the users that is useful to the users.

BRIEF DESCRIPTION OF THE DRAWINGS

Preferred embodiments of the inventive devices are illustrated in the drawings and are described below.

FIG. 3 illustrate a method of resolving conflict in an event calendar according to the invention.

FIG. 4 illustrates a method of reducing a set of harvested events to a set of serendipitous events.

Figure 1:
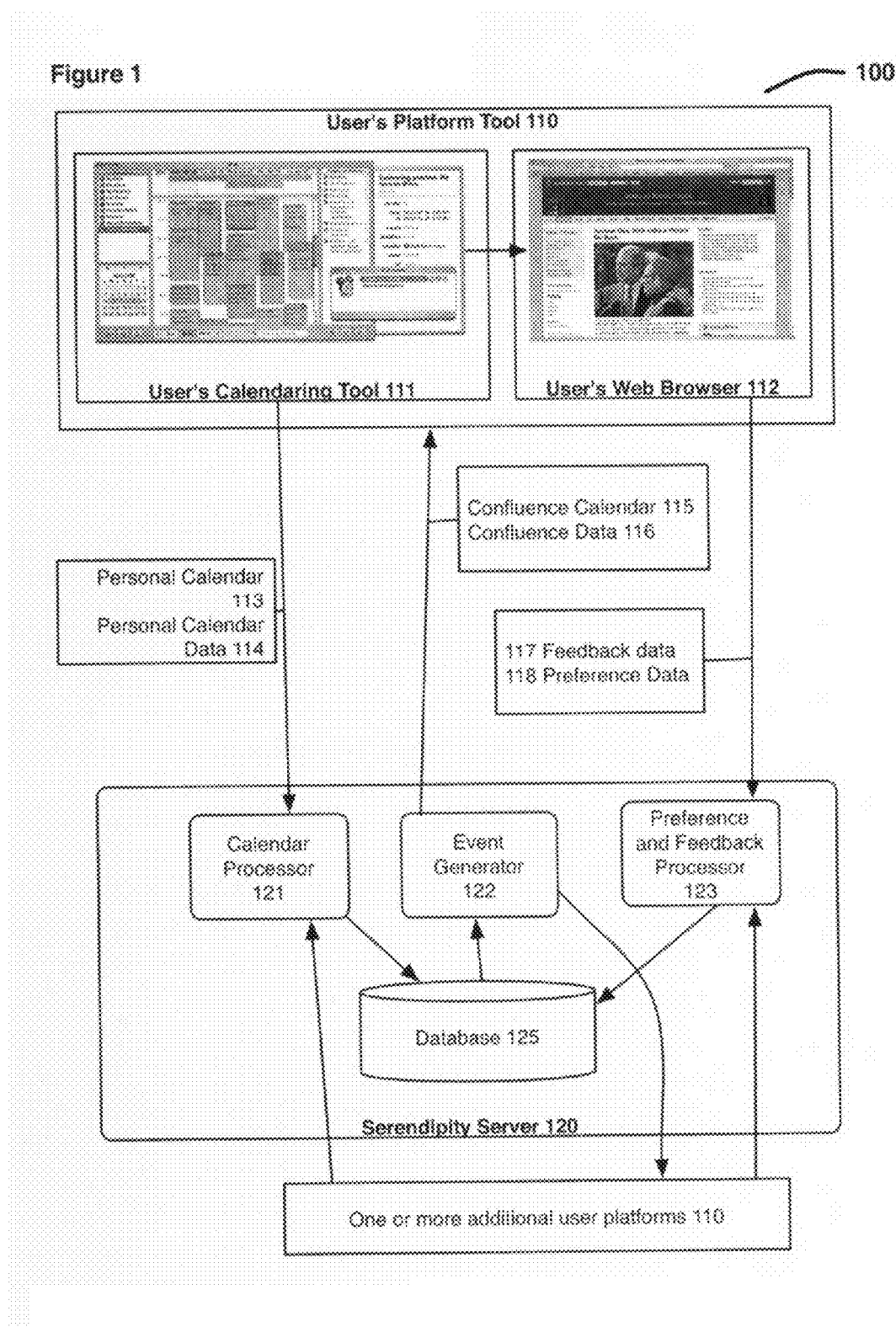
FIG. 1 illustrates a confluence calendar system according to the invention including at least one user platform and a serendipity server.

Throughout the figures, the same reference numerals and characters, unless otherwise stated, are used to denote like features, elements, components or portions of the illustrated embodiments. Moreover, while the subject matter of the invention will now be described in detail with reference to the figures, it is done so in connection with the illustrative embodiments. It is intended that changes and modifications can be made to the described embodiments without departing from the true scope and spirit of the subject invention as defined by the appended claims.

DETAILED DESCRIPTION

A detailed description of methods and systems for distributive calendaring is provided below for general applicability. In addition, several specific embodiments are provided as examples of the devices which one of ordinary skill in the art may apply these teachings to address specific problems and to illustrate the benefits and improvements of the system over known solutions.

Figure 2:
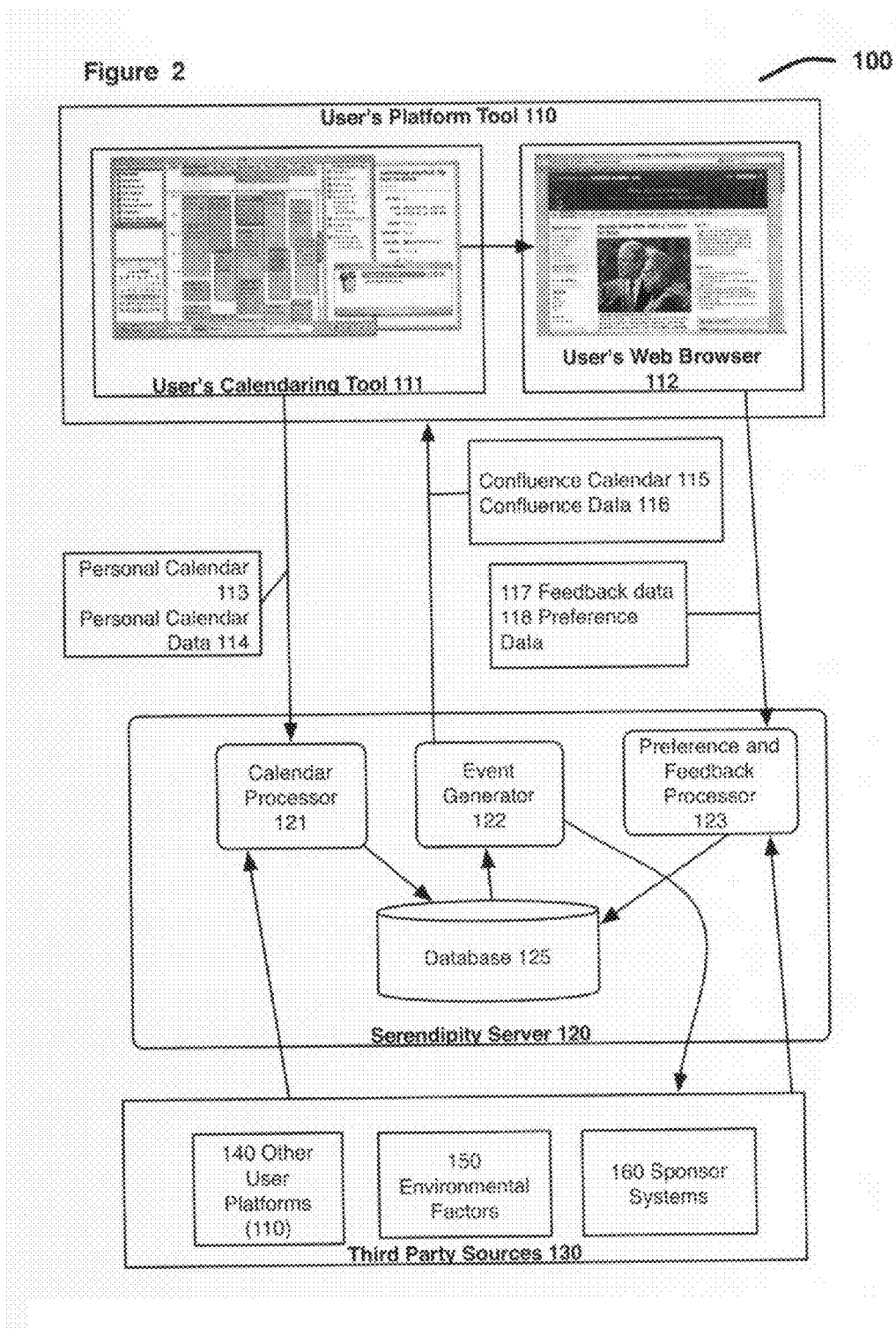
FIG. 2 illustrates a confluence calendar system according to the invention including a user platform, a serendipity server and at least one third party source.
Figure 5:
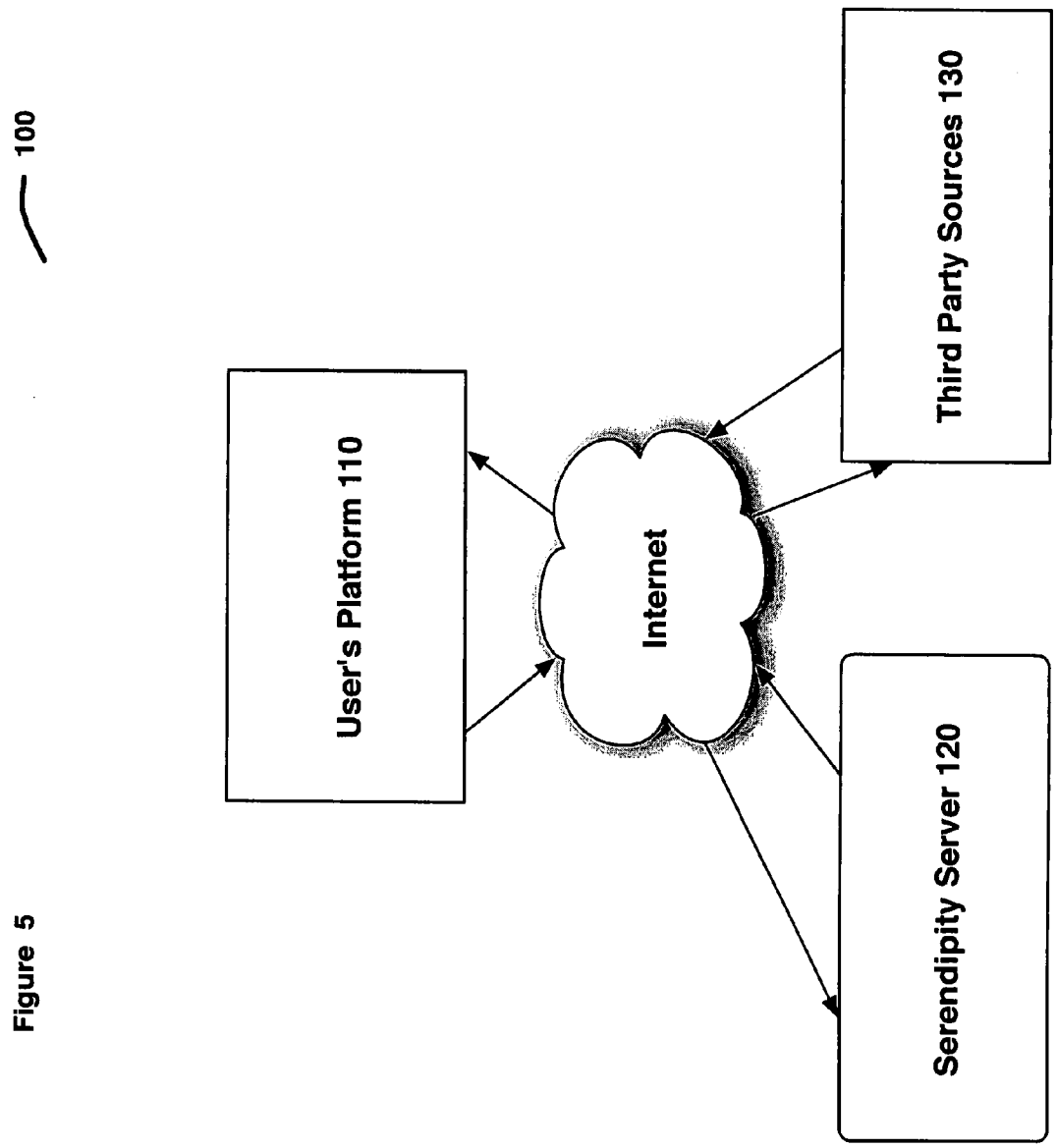
FIG. 5 illustrates a confluence calendar system according to the invention provided among a network of systems.

A diagram of a confluence calendar system 100 according to the invention is shown in FIG. 1. A confluence calendar system 100 includes at least one user platform 110, and at least one serendipity server 120. As shown in FIG. 1, an embodiment of the confluence calendar system 100 according to the invention, more than one user platforms 110 are operatively connected to the at least one serendipity server 120 to send and receive information with the serendipity server 120. FIG. 2 shows an alternative embodiment of the confluence calendar system 100 according to the invention wherein a user platform 110, a serendipity server 120 and one or more third party sources 130 are provided. Third party sources 130 include sponsor systems 160, other user platforms 140, and environmental systems 150, which can send and/or receive calendar and non-calendar information to and/or the serendipity server 120. Other user platforms 140 can be the same as user platforms 110 according to the invention. FIG. 5 illustrates a confluence calendar system 110 according to the invention provided among a network of systems, including a user platform 110, a serendipity server 120 and one or more third party sources 130.

A user platform 110 is a system that provides a user with access to his or her personal calendar 113 and with access to a confluence calendar 115 or confluence calendar data 116. In addition, the user platform 110 is operatively connected to a serendipity server 120 for sending and receiving information. Accordingly, a user platform 110 can have a user calendaring tool 111 for viewing and interacting with calendar data, including user calendar data 114 and confluence calendar data 116. The user platform 110 can also have a user network application 1112, such as a web browser, for sending and receiving data over a network, and/or for communicating with the serendipity server 120.

A confluence calendar 115, described in further detail below, displays confluence events that may be of interest to a user, such as the serendipitous proximity of a friend who is visiting the user's location, or of the opportunity to obtain tickets to a musical event that coincides with a user's travel plans to another location, among other things. Accordingly, the user platform enables a user to view confluence calendar data 116 as part of a confluence calendar 115, or as incorporated as a user's personal calendar 113.

The user platform 110 receives information, such as user confluence calendar data 116 provided by a serendipity server 120. User confluence calendar data 116 is generated by the serendipity server 120 based on a number of factors. The user's calendaring tool 111 can be configured to request an updated confluence calendar 115 or confluence data 116 either periodically or upon user's request. The confluence calendar 115 can be merged with and/or displayed with the user's personal calendar 113, or can be displayed separately by the user calendaring tool 111. Alternatively, or in addition, event notifications from confluence calendar data 116 can be received by one or more systems designated by a user, including a user platform 110, as updates are generated by the serendipity server 120.

The user calendaring tool 111 provides an interface for a user to view and schedule events, and to interact with calendar data. The user calendaring tool 111 can be provided on a user's local system, or it can be maintained at a remote server and accessed by using the user network application 112. The user calendaring tool 111 includes a user's personal calendar 113 and provides an interface for displaying and entering user calendar data 114, such as date, time, event, and location information, among other things. The user can periodically enter data related to a user's scheduled events into the personal calendar 113.

The user calendaring tool 111 can incorporate a user's existing calendaring system to display serendipitous events. For example, a user can choose to utilize a preferred calendaring tool, e.g., Apple's iCal, Microsoft Outlook, Mozilla Sunbird, Google Calendar etc., among others.

The user calendaring system 111 can be used to customize the system, set preferences, set subscription settings, identify a calendar server, identify a serendipity server 120, identify additional devices for receiving data from a serendipity server 120, among other things, as is described in further detail below. These settings can then be sent to a serendipity server 120. Alternatively, a user can use the network application 112 to access configuration and preference settings maintained by the serendipity server 120 for that particular user.

A network application 112 is provided to enable a user can subscribe to the services of a serendipity server 120. When the user subscribes, the user can provide the serendipity server 120 with the identity of a calendaring tool 111 of preference to the user. In addition, the network application 112 can be used to interact with a confluence calendar data 116 provided by the serendipity server 120.

The confluence calendar system 100 can provide the user with preference settings which can be maintained by either the user platform 110 or the serendipity server 120. For example, the user can provide the address for a remote server for hosting the user's personal calendar 113 and confluence calendar 115. In addition the user can subscribe or change subscription settings, such as account information, and frequency of updates. The user can also provide to whom the user's calendars may be published, establish a list of friends, subscribe to a list of service providers, establish a password for one or more of the user's calendars, among other things. Alternatively, or in addition, the user can provide a user address book, or other such list, to the serendipity server 120 so that the serendipity server 120 can use the information in the address book to establish a network of friends or contacts for generating one or more confluence calendars 115 for the user.

Alternatively, or in addition, the serendipity server 120 can provide the user with a selection of other users, third parties, and sponsors in the form of a list of available calendars which the user can view on the user platform 110. In addition, when a user uploads a list of friends, associates, or contacts to the serendipity server 120, the serendipity server 120 can determine whether members of this group have published calendars with the serendipity server 120. Thereafter, the serendipity server 120 can return a list of available calendars to the user for selection by the user for generating serendipitous events.

The user's calendaring tool 111 can periodically send a request to the serendipity server 120 for updated confluence calendars 115, whereupon the serendipity server 120 can dynamically generate a set of serendipitous events for the user based on the configuration outlined above and available calendar sources.

A confluence calendar system 100 according to the invention includes a serendipity server 120. The serendipity server 120 is in communication with one or more user platforms 110 and in alternative embodiment, one or more third party sources 130. The serendipity server 120 provides processing of one or more personal calendars 113 and/or user personal calendar data 114 provided by a user platform 110. The serendipity server 120 can comprise one or more systems for processing, and can include a calendar processor 121, an event generator 122, a preference and feed back processor 123, and one or more databases 125.

It can be appreciated that the processes provided by the serendipity server 120 can be incorporated into one or more devices and can include one or more data processing and storage devices. It can also be appreciated that the database 125 can be provided in various forms, including flat files, spreadsheets, among other things.

In one embodiment of the invention, the serendipity server 120 receives a user's personal calendar 113 for processing. Alternatively, or in addition, the serendipity server 120 can receive portions of the personal calendar 113, containing personal calendar data 114 associated with a user's personal calendar 113. The serendipity server 120 can receive the personal calendar data 114 periodically, such as when a personal calendar 113 is maintained by a server remote from the user, or the serendipity server 120 can receive the calendar data upon request by a user platform 110, such as when a user logs into the serendipity server 120.

A database 125 is providing for storing data that is received and processed by the serendipity server 120. It can be appreciated that the database 125 can be a storage means, such as computer memory, and can include one or more databases, including a parsed data database for storing data resulting from parsing processes, a new events database for storing generated events, a rules table for storing instructions for the serendipity server 120 to process different forms of data, a user preferences database for storing user preferences, a user feedback database for storing user feedback and tracking information, and a sponsor events table for storing sponsor specific information, among other things.

The serendipity server 120 processes a user's personal calendar 113 by one or more processes that include parsing, unrolling and flattening of the calendar data.

A serendipity server 120 can be provided with a calendar processor 113 for processing various forms of data received by the serendipity server 120, such as a user's personal calendar 113. The calendar processor 121 can also provide processing for data received from third party sources 130, such as sponsor systems 160, other user platforms 140, and environmental factors 150, among others. Environmental factors 150 can include systems that provide non-calendar data, such as information that does not have an associated date or location. A separate third party calendar processor can be provided for processing data from one or more of the third party sources.

The calendar processor 121 provides a parsing process which parses received data. For example, the parsing process can parse data from a personal calendar 113, pulling out key event data, including event name, event location, event type, and event details, among other things, as well as keywords and concepts. The calendar processor 121 can compare the newly received calendar data to existing calendar data stored on the serendipity server 120 to determine which event data in the received calendar is new.

In addition to key event data, such as the time, location and event detail that can be provided in a personal calendar 113, the calendar processor 121 can parse events to pull out additional data related to keywords and concepts. For example, if a user desires a serendipitous event to be found for a particular event included in the user's personal calendar 113, a user may tag the event, such as by selecting a field setting when entering data using the calendaring tool 111. Additionally, the user can provide information related to the nature of event (such as a flight, a meeting, travel, purchase, free time), details of event (such as number of tickets desired, number of travelers, hotel location) which information can be parsed and further processed by the serendipity server 120 to provide serendipitous events and services to the user.

It can be appreciated that several modes of parsing can be used to parse data from different source, such as personal calendar data 114, or portions of a personal calendar 113, as well as non-calendar data.

In addition, the calendar processor 121 can identify unscheduled time periods as potential periods for matching with comparison events provided by third party sources 130. In particular, windows for serendipity are identified by examining the location, time and description fields of each event, and assigning an event field as unscheduled time according to the rules of the serendipity server 120, such as when no other event is present, or when the event is includes information indicating an unallocated time period, or that the user is free, or not busy.

Parsed data for a user can be stored in the database 125, such as in user_events and/or user_calendars tables. Where more than one user platform 110 is provided, the calendar processor 121 can parse the calendars of several users and store the calendar data for the several users in the database 125 in areas defined for each user.

The serendipity server 120 can also provide for an unrolling process when recurring events are provided, such as a regularly scheduled Monday morning meeting, an individual's birthday, among other things. The unrolling process creates explicit events for each instances of a recurring event, thereby providing an explicit event that can be used in one or more later processes, such as flattening and matching.

The serendipity server 120 can provide a flattening process for providing a contiguous, non-overlapping time line. The flattening process can assign new or additional time information, and the set begin and end times for new events that are added to an existing or default calendar, and assign a location for an individual user for various times on or around the time of an event. It can be appreciated that a flattening process can also be provided with includes other factors and personal configuration settings, such as default locations for various time periods that may be unassigned. For example, a flattening process can use a default calendar which utilizes default settings, such as a default "home" location during the hours of 10 pm and 6 am, and a default "work" location during the hours of 9 am-6 pm during the work days of the week.

As shown in FIG. 3, a flattening process can set locations for an individual at various times under various circumstances and can resolve potential conflicts. In the several circumstances shown in FIG. 3, A represents a new event added to a calendar at location A', and B represents one or more existing events at one or more locations B'. A timeline T is also provided to graphically represent the beginning and end portions of events (t1, t2, t3, t4) associated with locations A' and B'. A flattening process according to the invention can provide a rule that the location of an event continuing later in time than an earlier event, and beginning later than an earlier event, takes precedence over the location of the event earlier in time when the locations conflict.

One reason for setting rules for precedence of later events over earlier events is that users typically have a better understanding of an event start time than end time. Another reason is that the system presumes that the user intends to go to the later event scheduled at the start time.

It can be appreciated that variations of this rule can be provided, which can include other factors for determination of the location, such as proximity to a default location among other things. For example, events comprising existing event B can be flattened in advance according to default locations, such as a default day which can be provided as a default flattened timeline to which new events are added according to the flattening process.

In an alternative embodiment, the serendipity server 120 can create a default flattened calendar based upon a user's default locations, and thereby create a timeline without any time periods and without an associated location. In such an embodiment, the locations denoted as "default" in the above description of FIG. 4, could be part of the one or more locations comprising the flattened calendar denoted as B. Alternatively, unallocated time periods can be preserved as having no location information, such as when the flattening process is applied to data from a third party source 130.

As shown in FIG. 3a, a new event A precedes existing event B. Accordingly, from t1 to t2, a user location can be set to A'; from t2-t3, a user location can be set to a user's default location; and from t3-t4, a user location can be set to B'.

As shown in FIG. 3b, a new event A follows existing event B. Accordingly, from t1 to t2, a user location can be set to B'; from t2-t3, a user location can be set to a user's default location; and from t3-t4, a user location can be set to A'.

As shown in FIG. 3c, a new event A exists during the time of event B, which precedes and follows new event A. Accordingly, from t1 to t2, a user location can be set to B'; from t2-t3, a user location can be set to A'; and from t3-t4, a user location can be set to B'.

As shown in FIG. 3d, a new event A begins during existing event B and continues after existing event B ends. Accordingly, from t1 to t2, a user location can be set to B'; from t2-t3, a user location can be set to A'; and from t3-t4, a user location can be set to A'.

As shown in FIG. 3e, a new event A precedes and follows existing event B, which exists during the time of event A. Accordingly, from t1 to t2, a user location can be set to A'; from t2-t3, a user location can be set to A'; and from t3-t4, a user location can be set to A'.

As shown in FIG. 3f, a new event A precedes existing event B which begins during new event A and continues after existing event A ends. Accordingly, from t1 to t2, a user location can be set to A'; from t2-t3, a user location can be set to B'; and from t3-t4, a user location can be set to B'.

The flattening process can also include a gluing process which can glue or associate two or more events having contiguous time periods and that share a location as a single event having the location and contiguous time period of the events.

Rules can be provided to accommodate other situations, such as a flight which has an expected end time and can provide precedence over later scheduled events, such as rental car pickup, by examining other data associated with the event, such as "flight" or "pickup rental car." The serendipity server 120 can make such calendar events dynamic to reflect changes in scheduling, such as a delayed flight, that do not require user input. Rules can be provided which are specific to the source, such as a particular user calendar, or third party source 130.

It can be appreciated that a flattening process can include additional processes to assign locations to a user for a period of time, and can be configured to provide locations within a flattening time frame, which is a period of time up to and until a configured set time frame rather than indefinitely. A flattening process according to the invention preferably assigns at least one location for all time periods with a flattening time frame. Alternatively, a flattening process can include probability factors when including more than one location for a period of time within a flattening time frame.

It can be appreciated that a user platform 110 can be provided with the one or more of the above-described parsing, unrolling and flattening processes, and can send processed calendar data to the serendipity server 120 for additional processing.

The serendipity server 120 can include an event generator 122 which analyzes the personal calendar data 114 provided by a user and compares the calendars of other users and third party sources 130. Preferably, the event generator 122 compares a flattened calendar date to one or more other flattened calendars, called comparison calendars. The comparison calendars can include calendars of other users, such as friends and business contacts, which can be specifically chosen by the user from a list of available calendars. Alternatively, or in addition, one or more of the comparison calendars can be chosen by the serendipity server 120 based on user preferences, or by the serendipity server 120 based on usage statistics, as well as sponsor relationships, among other things.

The event generator 122 provides matching and consolidating processes to produce confluence calendar data 116, which can be sent to a user and/or incorporated into one or more confluence calendars 115 to be sent to the user.

The event generator 122 provides a matching process to perform a comparison of calendar data and matching of event data therein, to thereby identify at least one harvested event for the compared calendars. The matching process preferably performs a comparison of two stored flattened calendars in performance of a matching process. Once a match is identified, the matching process can create a harvested event which identifies the two matching events, and can point the serendipity server 120 to the event data in the two stored flattened files. Thereafter, the matching process can compare additional calendars.

The matching process can utilize rules similar to the flattening rules described above and shown in FIG. 3 for matching of events having at least semi-contemporaneous time frames. For example, where events have time data indicating at least a common time frame, as illustrated in FIGS. 3c, 3d, 3e, 3f, the matching process can identify the compared events as having a matching time criteria.

If a time match is identified, the matching process can compare other matching criteria, such as location data associated with the events. If location data matches, the matching process can identify the location and time as a harvested event to be used for processing and generation of coincidence events, i.e., LuckyEvents, or apply additional matching criteria.

The matching process can be provided with additional rules and processes for identifying harvested events. For example, the location matching can be restricted in the case of the comparison of two user's personal calendars to require that at least one of two individuals be traveling away from their default home locations, thereby increasing the likelihood of identifying an event of interest to a user. It can be appreciated that such a rule is preferable since friends sharing a home location need not be alerted to each other's presence as a coincidence event.

In addition, or in the alternative, the location matching can include an approximation process for determining when events do not match exactly, but contain criteria that prompt the system to utilize an approximation. For example, an approximation process can be used when locations do not match exactly, but are within a distance that is likely to make the coincident event of interest. Thus, a harvested event can be generated for a first user having default home location in Boston, US and who is visiting Geneva, SZ at the same time that a second friend having a default home location in Prague, CZ is visiting Lausanne, SZ. Approximation location settings can be provided in a user's configuration to accommodate a certain distance when a user is traveling away from the user's default home and work locations, and can incorporate country comparison where a user may not wish to receive events that require the approximation to capture events that require crossing a political border. The approximation can also include a further specifier, requiring the event to be harvested only when the location to which the user is traveling is at least a certain distance from the user's default home location. In addition, or in the alternative, it can be appreciated that the approximation process can incorporate approximate time settings, and event criteria can be provided to prompt the system to utilize such an approximation.

The matching process can be provided with other matching criteria to further specify events that may be identified as harvested events. For example, a user can specifically identify users who are business contacts or friends for comparison by the matching process. Accordingly, additional data provided by a user during configuration can prompt additional choices for a user when entering data for an event in the user's calendaring tool 111. Thus, a user can change related configuration settings when entering event data to prompt use of specific approximation and matching processes that are applicable only for that event.

In addition, or in the alternative, the matching process can include the use of keywords as matching criteria. Accordingly, the event generator 122 can search for terms that may match against a predetermined list of terms maintained by the serendipity server 120. For example, the term "flight" may be included in an event provided by the user, and thus prompt a matching process to compare calendars of appropriate third party sources 130, such as alternative fights that may be of interest to the user.

In addition, the matching process can include the analysis of options that can be provided to the user when entering event information to tailor the matching process. For example, a user can check a "private" option when entering event information, and thus the event will not be published for comparison when the matching process is performed on other user's calendars.

It can be appreciated that the order of matching criteria can be ordered to minimize the time required to perform the matching process. For example, location data matching can be provided before time matching is performed. By optionally decoupling the data collection process from the calendar generation process, higher performance can be attained since the generation of calendar data to be sent to a user is not dependent on the how long collection of comparison events may take.

Thus, the matching process is provided which compares calendar data, such as flattened data from a user's personal calendar 113 with data from at least one other source, such as flattened calendar from other users, sponsors and environmental factors. Preferably, the matching process is performed for more than one other flattened calendar to provide a number of harvested events. The matching process can be performed when a user provides the serendipity server 120 with new calendar data, or when new comparison calendar data from another source relevant to the user is received by the serendipity server 120.

The information available from the user's personal calendar 113 can influence the processes of the event generator 122, not only by providing additional matching factors, but also allowing the event generator 122 to avoid matching against non-relevant events. For example, when a user's personal calendar 113 indicates "Flight", the serendipity server can suppress generation of local serendipitous events. As another example, when a user's personal calendar 113 indicates "Flight to SF", the serendipity server 120 can include events from sponsor systems 160, and generate flight options for the user. A further example is when a user's personal calendar 113 indicates "Flight to SF from XX to YY," the serendipity server 120 can suggest meetings with friends in SF within that window of time, and only generate sponsored events for SF during that window. A further example is when a personal calendar 113 indicates "Flight to SF from XX to YY, staying at hotel ZZ," the serendipity server 120 can also generate better hotel options and suggest local restaurants.

Once harvested events are generated, the event generator 122 can be provided with a consolidation process which consolidates the harvested events to create a manageable set of events for display to the user as a serendipitous event. The consolidation process compares harvested events for a user to identify those harvested events that have at least one event that is common to a harvested event from another user or third party source 130. The consolidation process groups those harvested events that have at least one common event into a lucky event, i.e., coincidence event or serendipitous event. Accordingly, the consolidation process provides a grouping of harvested events to reduce the number of available events for viewing by a user for a window of time into a manageable number. For example, a number of events can be consolidated into a single event.

For example, as shown in FIG. 4, a first user can have one event (E1) that matches an event (E3) for a second user, and matches as an event (E5) for a third user. The first user can have a second event (E2) which matches another event (E4) of the second user. Accordingly, after the matching process, three harvested events are produced (H1, H2, H3), each pointing to a pair of events. For those harvested events for the first user, the first and second harvested events (H1 and H2) share one event in common (E1), and accordingly a serendipitous event (L1) is produced from a consolidation of the first and second harvested events. Furthermore, the third harvested event (H3) for the first user comprises its own serendipitous event (L2), and is not consolidated further to a single event.

Similarly, serendipitous events can be generated for other users, as shown in FIG. 4. For example, a second user can be provided with two serendipitous events (L3 and L4), each comprising two harvested events (H2 and H3 respectively). A third user can be provided with a serendipitous event (L1), comprising one harvested event (H1). It should be appreciated that additional harvested event and serendipitous event can be generated where additional events are provided, or can be further limited where additional matching criteria, preference data 118, and/or feedback data 117 are used.

The event generator 122 can utilize other processes, such as rules associated with configuration settings, in order to prioritize which events are identified as coincidence events among a set of harvested events. For example, the serendipity server 120 can provide the user with the option to receive only one serendipitous event per day. Accordingly, it can be appreciated that the event generator 122 can determine which serendipitous event to display based on a number of factors, including the rarity of the event, the number of consolidated harvested events, as well as bidding priority, discussed below.

The event generator 122 can provide the serendipitous event data in the form of a confluence calendar 115 to be sent to the user, or as one or more events as confluence calendar data 116 to update a user's calendar.

In an alternative embodiment of the invention, the confluence calendar 115 can be provided as having an event table and an interests table. The event table can include the confluence events identified by the event generator 122. The interests table can include a selection of interests, which are non-date specific interests which the user can select for feedback to the serendipity server 120 for use as configuration settings.

The event generator 122 can also provide additional information related to the confluence events in the confluence calendar 115. For example, a serendipitous event can be provided with a URL link which can direct the user to an address where the user can obtain more information about the event, such as an alternative flight, a local map, or a restaurant, among other things.

The event generator 122 can provide the link with a signature that uniquely identifies the serendipitous event of a particular calendar. If the user activates the link, information can be sent to the serendipity server 120, such as to the preference and feedback processor 123, indicating that the user selected the link and thereby allow the serendipity server 120 to track which events the user considered.

The event generator 122 can also provide additional feedback options in the serendipitous event to be sent to the user so that the user can rank or rate the event by the degree of interest to the user, among other things. Alternatively, the user platform 110 can provide such a feedback mechanism for serendipitous events that it receives from the serendipity server 120.

The serendipity server 120 can include a feedback and preference processor 123 as having a forwarding process which can look up the original target URL of the sponsored event and send information to the user platform 110 to forward an address to the user which can redirect the user network application 112. The feedback and preference processor 123 can store information related to the user's use of the link by use of the signature or other such means. Thus, the feedback and preference processor 123 can provide traceability for applying a charge to the sponsors of the sponsored events for forwarding the information to the user.

The feedback and preference processor 123 can provide a tracking process to monitor the serendipitous events provided in confluence calendars to make sure that they are valuable to the users. Where feedback options are provided, a serendipitous event can be marked negatively and the event can be dropped or modified. Further tuning is possible by having the user rate confluence events based on how interesting they find them. If a serendipitous event is particularly exciting to the user, they can tag it in a positive manner by clicking through an embedded link in the serendipitous events provided in the confluence calendar 115. Similarly, serendipitous events which are less exciting can be tagged to prevent them from recurring. In addition, serendipitous events which are inappropriate for some reason can be flagged as such. Serendipitous events which are particularly interesting could be marked as "favorites", by a user so as to cause them to reoccur more frequently.

Accordingly, the feedback and preference processor 123 can retrieve feedback information related to relevance and appropriateness of serendipitous events reviewed by users and can store the data in the database 125. The information can be stored in one or more tables (e.g., the user_feedback table) and can be used by the event generator 122 to modify future identification of harvested events.

The confluence calendar system 100 provides configuration settings for the user to set and save preferences on the serendipity server 120 as discussed above. The feedback and preference processor 123 can provide the configuration process which manages the configuration settings. Among other things, configuration settings include address information for a published version of the user's personal calendar; default locations for the user throughout a day; the user's selections for the types of serendipitous events in which he or she is interested, including friends and sponsor systems; unscheduled times of day; the user interests; the user's favorite interests, including destinations, restaurants, bands, venues; and other things. A user can user the configuration process to subscribe to a class of services provided by third party sources 130, such as travel, hotel, cars, or events, among other things.

In an alternative embodiment of the invention, the confluence calendar system 100 can include one or more third party sources 130 for calendar and non-calendar data, including sponsor systems 160, other user platforms 140, as well as environmental factors 150.

Sponsor systems 160 are systems that send and receive information to the serendipity server for use by the event generator 122 as additional sources of events. Sponsored systems 160 include a number of resources which can be made available to a user during a given time window and location. For example, sponsor systems 160 can include advertising, business opportunities, and competing deals among other things. As non-limiting example, a sponsor system 160 can provide offers for travel offers (such as plane, train, or bus tickets), entertainment offers (such as movies, plays, concerts, or sports tickets), dining offers (such as available restaurants, coupons or special events), grocery coupons, other time limited deals, among other things.

Information from sponsor systems 160 can be received by the serendipity server 120 in the form of calendar data which can be processed by the event generator 122 for the creation of harvested and serendipitous events.

Alternatively, the serendipity server 120 can search for appropriate sources of sponsor system data based upon information provided by a user, such as flight information associated with a user event. The serendipity server 120 can search for and harvest serendipitous events from third party sources 130 and can obtain the information in various ways, such as RSS feeds, "scraping" web pages, parsing XML and so forth.

In an alternative embodiment of the invention, different forms of sponsor systems 160 can be treated differently by the serendipity server 120. For example, sponsor systems can provide different forms of information, and may receive information from the serendipity server 120 in order to tailor the information the sponsor systems 160 provided to the serendipity server 120. For example, a sponsor system 160 can provide general flight offers to the serendipity server 120, which can request more specific information that can prompt the sponsor system 160 to send more tailored information. In addition, the serendipity server 120 can be configured according to a commercial relationship with a sponsor system 160, and may provide a sponsor system 160 with priority over other sponsor systems 160 in terms of matching events provided by several sponsor systems.

Sponsor systems 160 provide a user with better deals related to event information provided by the user. In addition, advertisements can be provided which are tailored to information a user provides to the serendipity server 120, and which can be sent by the serendipity server 120 to the sponsor system 160. As an example, a user event may indicate a hotel reservation, which information can prompt a sponsor system 160 to send a coupon for a discount at a competing hotel as a comparison event to the serendipity server 120. The event generator 122 can process the sponsor system data and generate a harvested event, including the coupon information. Similarly, a user's personal calendar 113 that includes flight reservation information can prompt a sponsor system to provide a coupon for another airline and thus cause a serendipitous event to be generated including the coupon information.

Another type of third party source 130 is an environmental factor server 140, which provides additional information that may be of interest to a user, even though of a non-commercial nature. For example, when a user event indicates travel to a different city, the serendipity server 120 can search for information relevant to the event, such as weather or map information pertinent to the location. Such information can be sent to the user as a serendipitous event The third party sources 130 can also include one or more third party calendar servers, which can be users or other third parties which publish their event information with the serendipity server 120. For example, public services and commercial services can provide calendar information for use by the serendipity server 120 for generating serendipitous events.

Sponsor systems 160 can be prioritized by the event generator 122 based on a number of factors, including commercial bias provided by the sponsor systems 160. For example, sponsor systems 160 can be prioritized, and their significance to a user limited by an advertising network pay-per-click method or by using keyword advertising. Alternatively, a flat rate or standard auction mechanism could be incorporated to prioritize sponsor systems 160. As an example, restaurants may advertise lunch specials through coupons which can be prioritized by bidding for a given location and a time window. For example, sponsor systems 160 can submit bids for a collection of events based upon time, location, and event type, bids can be submitted by sponsors based upon other factors, such keywords, rarity of the event (such as sunny weather in Boston), the cost of the event (i.e., cheapest tickets, best coupon), how well the event matches what the user requests (i.e., closeness of hotel to target location), feedback provided by users (such as by indicating favorites), among other things.

When a user's calendar includes an unscheduled window of time, a serendipitous event can be generated for an open table at a restaurant if matching or preference criteria allow matching of such an event with an unscheduled time period.

As discussed above with regard to the event generator 122, there may be multiple events competing for the user's interest, and which can be consolidated and/or prioritized to provide only the most interesting and relevant events to the user. Another factor that can be used by the event generator is to prioritize serendipitous events that combine the most harvested events. For example, the more people that a user can meet the more interesting the event. Similarly, a rare restaurant opening can be prioritized.

The serendipity server 120 can publish the confluence calendar data 116 or confluence calendar 115 to one or more devices designated by the user, including the user platform 110. The user's calendaring tool 111, or portions thereof, can be incorporated in additional devices, which can be synchronized to a primary user calendaring tool 111. Additional devices include, but are not limited to a web schedule; a cell phone and other such hand-held devices, such as by cellular network, SMS messaging, or pager network; a user system's screen saver; a user system's email or remote email service; a user system's instant messaging service; widgets (small single purpose applications such as dashboards); chat interfaces; dedicated display devices, such as a desk clock, a smartwatch, wall clock, or refrigerator calendar, among other things. In addition, a user can configure the user calendaring tool 111 to enable calendar update notifications by the serendipity server 120 to one or more additional devices to apprise the user of a particular event of interest, or to apprise the user of an updated calendar, among other things.

The invention claimed is:

1. A confluence calendar system for use in a network of systems comprising:
    at least one user platform comprising a user calendaring tool and a user network application, wherein the user calendaring tool comprises a plurality of user calendar events and preference information, said plurality of user calendar events including personal calendar data comprising time information associated with the user calendar events, location information associated with the user calendar events, and event detail information associated with the user calendar events; said preference information comprising at least a user default location, and
    a serendipity server comprising a serendipitous event generator;
    wherein the user network application is operatively connected to the serendipity server;
    wherein the serendipity server is adapted to receive a plurality of third party calendar events from at least one third party calendar source, said third party calendar events including third party calendar data comprising time information associated with the third party calendar events, location information associated with the third party calendar events, and event detail information associated with the third party calendar events;
    wherein the serendipity server receives at least a portion of the plurality of user calendar events;
    wherein the serendipitous event generator is adapted to search for at least one serendipitous event by comparing at least the time information, location information, and at least a portion of the preference information of the user calendar data with at least the time information and location information of the third party calendar data, wherein the time information of the user calendar data is future time information and the time information of the third party calendar data is future time information
    wherein the serendipity server further comprises a preference and feedback processor wherein the preference and feedback processor is adapted to receive feedback data from the user platform, and wherein the serendipitous event generator is further adapted to generate serendipitous events based on the feedback data, wherein said feedback data is selected from the group comprising data indicating a user's selection of a previously presented serendipitous event, and data indicating a user's rating of a previously presented serendipitous event by degree of interest to the user;
    wherein the serendipity server receiving and parsing the plurality of user calendar events and the plurality of third party calendar events, wherein matching and harvesting said third party calendar events comprise flattening the plurality of user calendar events and the plurality of third party calendar events, said flattening comprising assigning non-overlapping time information for the plurality of user calendar events and the plurality of third party calendar events.

2. The confluence calendar system according to claim 1, wherein the serendipity server further comprises a calendar processor for parsing the plurality of user calendar events and the plurality of third party calendar events to obtain personal calendar data and third party calendar data; wherein the serendipity server is further adapted to harvest harvested user events from the personal calendar data; wherein the serendipity server is further adapted to harvest harvested third party events from the third party calendar data, and wherein the serendipitous event generator is further adapted to generate serendipitous events by comparing at least the time information and location information of the harvested user events with the third party calendar data of the harvested third party events, wherein said serendipitous events are future serendipitous events.

3. The confluence calendar system according to claim 2, wherein the event generator is further adapted to generate at least one additional serendipitous event by prioritizing the serendipitous events according to prioritizing criteria, said prioritizing criteria being selected from the group comprising event identification information, time information, location information and event detail information.

4. The confluence calendar system according to claim 1, further comprising at least one third party calendar source, wherein the third party calendar source comprises a plurality of third party calendar events, said third party calendar events including third party calendar data selected from the group of date information, location information, and event detail information.

5. The confluence calendar system according to claim 1, wherein the serendipity server further comprises a preference and feedback processor, wherein the preference and feedback processor is adapted to receive preference data from the user platform, and wherein the serendipitous event generator is adapted to search for serendipitous events based on the preference data, wherein said serendipitous events exclude events having matching default location.

6. The confluence calendar system according to claim 1, wherein the serendipity server is further adapted to flatten the plurality of user calendar events and the plurality of third party calendar events, whereby the plurality of user calendar events and the plurality of third party calendar events are assigned non-overlapping time information, whereby the location of an event continuing later in time than an earlier event, and beginning later than an earlier event, takes precedence over the location of the event earlier in time when the locations conflict.

7. The confluence calendar system according to claim 1, wherein the serendipity server is further adapted to generate a confluence calendar and is adapted to send the confluence calendar to the user platform, wherein the confluence calendar includes third party calendar data.

8. The confluence calendar system according to claim 1, wherein the serendipity server is further adapted to send at least a portion of the plurality of user calendar events, and is further adapted to receive a plurality of third party calendar events from at least one third party calendar source, said third party calendar events including third party calendar data tailored to the at least a portion of the plurality of user calendar events.

9. A confluence calendar system according to claim 1, wherein the serendipitous event generator is further adapted to search the user calendar data for at least one user unscheduled time period, and to search for at least one third party event having third party location information matching user location information associated with the at least one user unscheduled time period, wherein the user location information is different than the user default location.

10. A confluence calendar system according to claim 1, wherein the serendipitous event generator is further adapted to search the user calendar data for at least one user unscheduled time period, to search the third party calendar data for at least one third party unscheduled time period, and to search for at least one third party unscheduled time period having third party location information matching user location information associated with the at least one user unscheduled time period, wherein the user location information is different than the user default location.

11. A confluence calendar system according to claim 1, wherein the serendipitous event generator is further adapted to search the user calendar data for at least one user unscheduled time period, to search the third party calendar data for at least one third party unscheduled time period, and to search for at least one third party unscheduled time period having third party location information matching user location information associated with the at least one user unscheduled time period, wherein the third party location information is different than the third party default location.

12. A method of collective calendaring comprising the steps of:
receiving a plurality of user calendar events and user preference information from at least one user, said user calendar events comprising at least one user event information comprising future time information associated with the user calendar events, location information associated with the user calendar events, and event detail information associated with the user calendar events, said preference information comprising at least a user default location;
receiving a plurality of third party calendar events from at least one third party calendar source, said third party calendar events comprising at least one third party event information comprising future time information associated with the third party calendar events, location information associated with the third party calendar events, and event detail information associated with the third party calendar events;
harvesting at least one matching event by matching said user calendar events with said third party calendar events based on at least one matching criteria, said matching criteria chosen from the group of event identification, time and location, preference information and event detail information; and
generating at least one future serendipitous event from the at least one matching events, and
receiving feedback data from at least one user, and wherein the step of generating serendipitous events includes generating serendipitous events based on the feedback data, wherein said feedback data is selected from the group comprising data indicating a user's selection of a previously presented serendipitous event, and data indicating a user's rating of a previously presented serendipitous event by degree of interest to the user,
wherein the receiving step comprises parsing the plurality of user calendar events and the plurality of third party calendar events, wherein the harvesting step comprises flattening the plurality of user calendar events and the plurality of third party calendar events, said flattening comprising assigning non-overlapping time information for the plurality of user calendar events and the plurality of third party calendar events.

13. The method of collective calendaring according to claim 12, wherein the step of generating at least one serendipitous event further comprises consolidating the at least one harvested event.

14. The method of collective calendaring according to claim 12, wherein the step of generating at least one serendipitous event further comprising the step of prioritizing the at least one serendipitous event based on at least one prioritizing criteria selected from the group comprising event identification information, time information, location information and event detail information.

15. The method of collective calendaring according to claim 12, further comprising receiving preference information from the at least one user, said preference information selected from the group comprising event identification information, time information, location information and event detail information.

16. The method of collective calendaring according to claim 15, wherein the step of generating serendipitous events includes comparing user calendar events with said third party calendar events based on at least one comparison criteria, said comparison criteria chosen from the group of event identification, time and location, event detail information, and preference information.

17. The method of collective calendaring according to claim 15, wherein the step of generating at least one serendipitous event further comprises prioritizing the at least one serendipitous event based on at least one prioritizing criteria selected from the group comprising event identification information, time information, location information, event detail information, and preference information.

18. The method of collective calendaring according to claim 12, wherein the flattening step includes assigning default location information to at least one of said plurality of user calendar events.

19. The method of collective calendaring according to claim 12, wherein the harvesting step includes approximating at least one of the comparison criteria.

* * * * *